United States Patent
Parusel et al.

(10) Patent No.: US 7,064,894 B2
(45) Date of Patent: Jun. 20, 2006

(54) REAR PROJECTION SCREEN AND METHOD FOR THE PRODUCTION THEREOF

(75) Inventors: Markus Parusel, Messel (DE); Jann Schmidt, Darmstadt (DE); Herbert Groothues, Weiterstadt (DE); Wolfgang Scharnke, Darmstadt (DE); Hans Lorenz, Darmstadt (DE); Helmut Haering, Reinheim (DE); Guenther Dickhaut-Bayer, Riedstadt (DE)

(73) Assignee: Roehm GmbH & Co. KG, Darmstadt (DE)

( * ) Notice: Subject to any disclaimer, the term of this patent is extended or adjusted under 35 U.S.C. 154(b) by 69 days.

(21) Appl. No.: 10/495,428

(22) PCT Filed: Sep. 27, 2003

(86) PCT No.: PCT/EP03/17062

§ 371 (c)(1),
(2), (4) Date: May 21, 2004

(87) PCT Pub. No.: WO2004/042471

PCT Pub. Date: May 21, 2004

(65) Prior Publication Data

(30) Foreign Application Priority Data

Nov. 5, 2002 (DE) .................................. 102 51 778

(51) Int. Cl.
*G03B 21/60* (2006.01)
*G03B 21/56* (2006.01)
(52) U.S. Cl. ........................ 359/453; 359/452; 359/460
(58) Field of Classification Search ................ 359/453, 359/443, 452, 460
See application file for complete search history.

(56) References Cited

U.S. PATENT DOCUMENTS

| | | | | |
|---|---|---|---|---|
| 6,695,453 | B1* | 2/2004 | Hannington | 359/614 |
| 6,869,195 | B1* | 3/2005 | Hannington | 359/614 |
| 6,896,757 | B1* | 5/2005 | Hannington | 156/230 |
| 2004/0096627 | A1* | 5/2004 | Hannington | 428/143 |

FOREIGN PATENT DOCUMENTS

| | | |
|---|---|---|
| EP | 0342283 | 11/1989 |
| EP | 0495593 | 7/1992 |
| EP | 0561551 | 9/1993 |

* cited by examiner

*Primary Examiner*—W. B. Perkey
*Assistant Examiner*—Magda Cruz
(74) *Attorney, Agent, or Firm*—Oblon, Spivak, McClelland, Maier & Neustadt, P.C.

(57) ABSTRACT

A rear-projection screen that has at least one light-scattering polymethyl methacrylate layer in which is embedded spherical plastic particles; the previously described rear-project screen that has an additional plastic sheet that does not have embedded scattering beads; and a method of making a rear-projection screen.

18 Claims, 3 Drawing Sheets

REAR PROJECTION SCREEN AND METHOD FOR THE PRODUCTION THEREOF

The present invention relates to rear-projection screens encompassing at least one light-scattering polymethyl methacrylate layer and to processes for producing these rear-projection screens.

Using the technique of rear projection, information can be made available to a wide audience. In principle, the structure of this type of system is composed of an image surface which is illuminated from the rear by a projector and thus provides the information.

Examples of the use of this technique are found in control rooms (power stations, railways), where they make it easier for those responsible to gain an overview of the complex processes, thus permitting avoidance of control errors. Another application is given by display panels in, for example, sports stadia and at motor-racing events. Here, the spectators are given information about progress and events as they occur, even if they are very distant from the action itself.

These image surfaces are very large. Constant technical advances (projector technology) have added other fields of application over the years.

For example, this type of information provision is also used in, for example, TV equipment, large-scale cinemas and home cinemas, and as a promotional medium at exhibitions, in window displays, and in shops.

This technique is moreover also used to provide information during presentations and in flight simulators, where the virtual environment is depicted on the cockpit screen with maximum simulation of reality.

A source of many advantages of this technique is that the projector is outside the viewing space. This means that projection is not interrupted by any observer located in front of the projection surface, and distracting noises from the projector are eliminated, and the room can be attractively designed.

There is now a wide variety of plastic sheets and foils which are used in rear-projection technology. Sheets are often modified to give them defined surface structures in the form of Fresnel lens systems on the rear side and also vertically arranged lenticular lenses on the observer side. The production of these rear-projection panels is therefore expensive. The surface structures can moreover be very sensitive to mechanical load. Damage causes very great impairment of the appearance of the projected image.

There are also known rear-projection sheets and foils which comprise scattering media, these sheets comprising particles whose refractive index differs from that of the matrix. The sheets and foils are likewise suitable for rear projection, but each does not cover the entire range of requirements, and therefore only some of the requirements placed upon a screen are met.

Because of the large number of different possible uses, a very wide variety of requirements are placed upon the projection surface. By way of example, in one application the projection surfaces have to provide a very steady, clear and high-resolution reproduction of the image, because the observer here has to take in the information over a prolonged period (example: control rooms, home cinema, etc.).

When these projection surfaces are used for presentation and promotional purposes, for example on exhibition stands, the surfaces then have to be particularly resistant to mechanical load and soiling, while the requirements for projection quality are not so high.

By way of example, sheets and films which provide a high light-scattering angle can be produced using known scattering media, such as barium sulphate and titanium dioxide. The projection resolution is likewise high. The viewing angle for the image should likewise be correspondingly high. However, even at low thicknesses, the image quality on the projection sheets is found to be blurred and hazy, and achievement, or capability to provide, the other requirements, such as good surface finish, is found to be absent or only partial.

There are also known screens which comprise plastics particles as scattering media. For example, the document JP11179856 describes multilayer sheets with at least one layer which encompasses a polymethyl methacrylate matrix and also encompasses crosslinked polymethyl methacrylate beads as scattering/matting agent, the proportion of the beads being in the range from 0.5 to 25% by weight. The size of the beads is in the range from 3 to 30 µm, and the examples describe merely sheets of thickness 2 mm which comprise about 3% by weight of scattering beads whose size is about 6 µm. Light transmittance and surface gloss are described, but the imaging properties of the sheet are not ideal.

The Japanese laid-open specification JP 07234304 describes a mixture of crosslinked acrylate-styrene beads (14 µm) in a transparent plastic. No description of surface roughness is given, but the sheets described in the examples are produced by injection moulding, and very high pressure is therefore exerted on the sheets, this pressure generally leading to very low surface roughness. The sheets produced as in the examples do not have ideal imaging performance.

The publication EP-A-0 561 551 describes a multilayer sheet with a scattering layer of a mixture of a transparent polymer and spherical particles (2–15 µm). The concentration of the particles is in the range from 0.1 to 40% by weight. In the examples a multilayer sheet was produced with a light-scattering layer of thickness 0.64 mm which encompasses 20% by weight of particles whose size is about 5 µm. Again, this sheet does not provide an ideal picture.

A problem with known rear-projection screens with scattering media is therefore that their imaging properties are non-ideal. In particular, the known screens have relatively low image sharpness or relatively poor brightness distribution. There are also problems in relation to colour accuracy. In addition, many screens are not equal to the mechanical requirements, and scratches in particular here have a disadvantageous optical effect.

In the light of the prior art stated and discussed herein, it was therefore an object of the present invention to provide rear-projection screens which permit particularly high picture quality. In particular, the screens should permit high image sharpness and high resolution of the projected picture.

Furthermore, the images on the rear-projection screens should have particular colour accuracy.

Another object of the invention was to provide rear-projection screens which have particularly uniform brightness distribution.

In addition, the rear-projection screens should have maximum mechanical stability. There should be no, or only slight, visibility here of scratches on the screen. In particular, damage should have no, or only slight, effect on the image reproduction capability of the screen.

Another object on which the invention was based was to provide rear-projection screens which are capable of particularly simple production. In particular, therefore, the rear-projection screens should be capable of production via extrusion.

Another object of the present invention, therefore, was to create rear-projection screens which have high picture steadiness. This means that the information presented can be observed over a long period with no fatigue.

Another object of the present invention was to provide rear-projection screens whose size and shape can easily be adapted to the requirements.

In addition, the images on the rear-projection screens should have particularly good contrast.

Another object of the invention was to give the rear-projection screens high durability, in particular high resistance to UV irradiation or to weathering.

Another object on which the present invention was based was to provide rear-projection screens whose image properties involve only a slight degree of reflection.

In addition, the rear-projection screens created should have low susceptibility to scratching.

The rear-projection screens described in claim 1 achieve these objects, and also achieve other objects which, although they are not specifically mentioned, are obvious or necessary consequences of the circumstances discussed herein. Useful modifications of the inventive rear-projection screens are protected by the subclaims dependent on claim 1.

Claim 18 achieves the underlying object with respect to the processes for producing rear-projection screens.

Rear-projection screens which permit particularly high picture quality can be provided if the concentration of the spherical plastics particles $c_P$, the thickness of the light-scattering polymethyl methacrylate layer $d_S$, and the size of the spherical plastics particles $D_P$ is selected in such a way that the ratio $c_P*d_S/D_P^3$ is in the range from 0.0015 to 0.015% by weight*mm/μm$^3$ and the ratio of average surface roughness of the polymethyl methacrylate layer $R_a$ to the size of the spherical plastics particles $D_P$ is in the range from 0.05 to 0.4, and if the rear-projection screen encompasses at least one light-scattering polymethyl methacrylate layer of thickness in the range from 0.05 to 4 mm comprising spherical plastics particles whose size is in the range from 5 to 35 μm, at a concentration in the range from 2 to 60% by weight, based on the total weight of the light-scattering polymethyl methacrylate layer, the refractive index of the spherical plastics particles differing from that of the polymethyl methacrylate matrix by a value in the range from 0.02 to 0.2.

The inventive measures achieve, inter alia, the following particular advantages:

The rear-projection screens of the present invention permit high picture sharpness and high resolution of the projected picture.

The image on the inventive rear-projection screens has particular colour accuracy and particularly good contrast.

The rear-projection screens provided according to the present invention have particularly uniform brightness distribution.

In addition, the rear-projection screens of the present invention have high mechanical stability. Scratches on the screen here are invisible or only slightly visible.

Furthermore, pictures projected onto the inventive rear-projection screens have high picture steadiness. This means that information presented can be observed over a long period with no fatigue.

In addition, the rear-projection screens of the present invention exhibit a non-glossy, matt surface profile. Where appropriate, the surface structure can be varied without affecting the optical parameters other than gloss. This makes it possible to reduce the extent of reflections which adversely affect the image on the screen.

In addition, the rear-projection screens of the present invention can be produced with particular ease. For example, the rear-projection screens can in particular be produced via extrusion.

The inventive rear-projection sheets exhibit high resistance to weathering, in particular to UV irradiation.

The size and shape of the rear-projection screens can be adapted to the requirements.

The light-scattering polymethyl methacrylate layer of the rear-projection screen according to the present invention comprises from 2 to 60% by weight, in particular from 3 to 55% by weight, and preferably from 6 to 48% by weight, based on the weight of the light-scattering polymethyl methacrylate layer, of spherical plastics particles.

For the purposes of the present invention, the term spherical means that the plastics particles preferably have a spherical shape, but it is clear to the person skilled in the art that, as a consequence of the methods of production, it is also possible that plastics particles with some other shape may be present, or that the shape of the plastics particles may deviate from the ideal spherical shape.

The term spherical therefore means that the ratio of the largest dimension of the plastics particles to the smallest dimension is not more than 4, preferably not more than 2, each of these dimensions being measured through the centre of gravity of the plastics particles. Based on the number of plastics particles, at least 70% are preferably spherical, particularly at least 90%.

The average (weight-average) diameter of the plastics particles is in the range from 5 to 35 μm, preferably in the range from 8 to 25 μm. 75% of the plastics particles advantageously lie in the range from 5 to 35 μm.

The particle size, and also the particle size distribution, may be determined by means of a laser extinction method. To this end, use may be made of a Galai-CIS-1 from L.O.T. GmbH, the method of measurement for particle size determination being found in the user manual.

The plastics particles which can be used according to the invention are not subject to any particular restriction. The nature of the plastic from which the plastics particles are produced is therefore substantially non-critical, but refraction of light takes place at the phase boundary between the plastics beads and the matrix plastic.

Accordingly, the refractive index of the plastics particles, measured for the Sodium D line (589 nm) at 20° C. differs from the refractive index no of the matrix plastic by from 0.02 to 0.2 units.

The spherical plastics particles preferably encompass crosslinked polystyrene and/or crosslinked poly(meth)acrylates.

The structure of preferred plastics particles comprises:

b1) from 25 to 99.9 parts by weight of monomers which have aromatic groups as substituents, for example styrene, α-methylstyrene, ring-substituted styrenes, phenyl (meth)acrylate, benzyl (meth)acrylate, 2-phenylethyl (meth)acrylate, 3-phenylpropyl (meth)acrylate or vinyl benzoate; and also b2) from 0 to 60 parts by weight of an acrylic and/or methacrylic ester having 1 to 12 carbon atoms in the aliphatic ester radical, these being copolymerizable with the monomers b1), and mention may be made here of the following by way of example: methyl (meth)acrylate, ethyl (meth)acrylate, n-propyl (meth)acrylate, isopropyl (meth)acrylate, n-butyl (meth)acrylate, isobutyl (meth)

acrylate, tert-butyl (meth)acrylate, cyclohexyl (meth) acrylate, 3,3,5-trimethylcyclohexyl (meth)acrylate, 2-ethylhexyl (meth)acrylate, norbornyl (meth)acrylate or isobornyl (meth)acrylate;

b3) from 0.1 to 15 parts by weight of crosslinking comonomers which have at least two ethylenically unsaturated groups copolymerizable by a free-radical route with b1) and, where appropriate, with b2), examples being divinylbenzene, glycol di(meth)acrylate, 1,4-butanediol di(meth)acrylate, allyl (meth)acrylate, triallyl cyanurate, diallyl phthalate, diallyl succinate, pentaerythritol tetra (meth)acrylate or trimethylolpropane tri(meth)acrylate, where the amounts of the comonomers b1), b2) and b3) give a total of 100 parts by weight.

Mixtures from which the plastics particles are produced particularly preferably comprise at least 80% by weight of styrene and at least 0.5% by weight of divinylbenzene.

The production of crosslinked plastics particles is known to the person skilled in the art. For example, the scattering particles may be produced by emulsion polymerization, for example as described in EP-A 342 283 or EP-A 269 324, and very particularly preferably via organic-phase polymerization, for example as described in the German Patent Application P 43 27 464.1. The last-mentioned polymerization technique gives particularly narrow particle size distributions or, in other words, particularly small deviations of the particle diameters from the average particle diameter.

It is particularly preferable to use plastics particles whose heat resistance extends to at least 200° C., in particular at least 250° C., with no intended resultant restriction. The term heat-resistant here means that the particles are not subject to any substantial thermal degradation. Thermal degradation causes undesirable discoloration making the plastics material unusable. Particularly preferred particles are, inter alia, obtainable from Sekisui with the trade name ®Techpolymer SBX-6, ®Techpolymer SBX-8 and ®Techpolymer SBX-12.

In another preferred embodiment of the present invention, the size of the spherical particles is in the range from 15 to 35 μm. In this embodiment, at least 60% of the spherical particles particularly preferably have a diameter of at least 15 μm and at most 30% of the scattering beads particularly preferably have a diameter of more than 25 μm. According to one particular aspect, the size of at most 80% of these spherical particles is in the range from 15 to 25 μm.

In one particular aspect of the present invention, these particles have uniform distribution in the plastics matrix, with no significant aggregation or agglomeration of the particles. Uniformly distributed means that the concentration of particles is substantially constant within the plastics matrix.

The light-scattering layer encompasses not only the spherical particles but also a plastics matrix which comprises polymethyl methacrylate (PMMA). The light-scattering polymethyl methacrylate layer preferably encompasses at least 30% by weight of polymethyl methacrylate, based on the weight of the light-scattering layer.

Polymethyl methacrylates are generally obtained via free-radical polymerization of mixtures which comprise methyl methacrylate. These mixtures generally comprise at least 40% by weight, preferably at least 60% by weight, and particularly preferably at least 80% by weight, of methyl methacrylate, based on the weight of the monomers.

Alongside this, these mixtures for preparing polymethyl methacrylates may comprise other (meth)acrylates which are copolymerizable with methyl methacrylate. The term (meth)acrylates encompasses methacrylates and acrylates, and also mixtures of the two.

These monomers are well known. They include (meth) acrylates derived from saturated alcohols, for example methyl acrylate, ethyl (meth)acrylate, propyl (meth)acrylate, n-butyl (meth)acrylate, tert-butyl (meth)acrylate, pentyl (meth)acrylate and 2-ethylhexyl (meth)acrylate; (meth)acrylates derived from unsaturated alcohols, for example oleyl (meth)acrylate, 2-propynyl (meth)acrylate, allyl (meth)acrylate, vinyl (meth)acrylate; aryl (meth)acrylates, such as benzyl (meth)acrylate or phenyl (meth)acrylate, where in each case the aryl radicals may be unsubstituted or have up to four substituents; cycloalkyl (meth)acrylates, such as 3-vinylcyclohexyl (meth)acrylate, bornyl (meth)acrylate; hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate; glycol di(meth)acrylates, such as 1,4-butanediol (meth) acrylate, (meth)acrylates of ether alcohols, for example tetra-hydrofurfuryl (meth)acrylate, vinyloxyethoxyethyl (meth)acrylate; amides and nitriles of (meth)acrylic acid, for example N-(3-dimethylaminopropyl)(meth)acrylamide, N-(diethyl-phosphono)(meth)acrylamide, 1-methacryloylamido-2-methyl-2-propanol; sulphur-containing methacrylates, such as ethyl-sulphinylethyl (meth)acrylate, 4-thiocyanatobutyl (meth)acrylate, ethylsulphonylethyl (meth) acrylate, thiocyanatomethyl (meth)acrylate, methylsulphinylmethyl (meth)acrylate, bis((meth)acryloyloxyethyl) sulphide; polyfunctional (meth)acrylates, such as trimethyloyl-propane tri(meth)acrylate.

Besides the abovementioned (meth)acrylates, the compositions to be polymerized may also comprise other unsaturated monomers copolymerizable with methyl methacrylate and the abovementioned (meth)acrylates.

They include 1-alkenes, such as 1-hexene, 1-heptene; branched alkenes, such as vinylcyclohexane, 3,3-di-methyl-1-propene, 3-methyl-1-diisobutylene, 4-methyl-1-pentene; acrylonitrile; vinyl esters, such as vinyl acetate; styrene, substituted styrenes having an alkyl substituent in the side chain, e.g. α-methylstyrene and α-ethylstyrene, substituted styrenes having an alkyl substituent on the ring, such as vinyltoluene and p-methylstyrene, halogenated styrenes, such as mono-chlorostyrenes, dichlorostyrenes, tribromostyrenes and tetrabromostyrenes; heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinyl-pyrimidine, vinylpiperidine, 9-vinylcarbazole, 3-vinyl-carbazole, 4-vinylcarbazole, 1-vinylimidazole, 2-methyl-1-vinylimidazole, N-vinylpyrrolidone, 2-vinyl-pyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles; vinyl and isoprenyl ethers; maleic acid derivatives, such as maleic anhydride, methylmaleic anhydride, maleimide, methylmaleimide; and dienes, such as divinylbenzene.

The amount generally used of these comonomers is from 0 to 60% by weight, preferably from 0 to 40% by weight, and particularly preferably from 0 to 20% by weight, based on the weight of the monomers, and these compounds may be used individually or in the form of a mixture.

The polymerization is generally initiated using known free-radical initiators. Among the preferred initiators are, inter alia, the azo initiators well-known to the person skilled in the art, for example AIBN and 1,1-azobiscyclohexanecarbonitrile, and also peroxy compounds, such as methyl ethyl ketone peroxide, acetylacetone peroxide, dilauroyl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the abovementioned compounds with one another, and also mixtures of the abovementioned compounds with compounds not mentioned but likewise capable of forming free radicals.

The amount often used of these compounds is from 0.01 to 10% by weight, preferably from 0.5 to 3% by weight, based on the weight of the monomers.

Use may be made here of various poly(meth)acrylates which differ, for example in their molecular weight or in their monomeric constitution.

The matrix of the light-scattering layer may moreover comprise other polymers in order to modify its properties. Among these are, inter alia, polyacrylo-nitriles, polystyrenes, polyethers, polyesters, polycarbonates and polyvinyl chlorides. These polymers may be used individually or in the form of a mixture, and it is also possible here to use copolymers which are derivable from the abovementioned polymers.

The weight-average molar mass $M_W$ of the homo- and/or copolymers to be used as the matrix polymer may vary within a wide range, the molar mass usually being matched to the intended use and to the mode of processing of the moulding composition. However, it is generally in the range from 20 000 to 1 000 000 g/mol, preferably from 50 000 to 500 000 g/mol and particularly preferably from 80 000 to 300 000 g/mol, with no intended resultant restriction.

In one particular embodiment of the present invention, the matrix of the light-scattering polymethyl methacrylate layer has at least 70% by weight, preferably at least 80% by weight, and particularly preferably at least 90% by weight, of polymethyl methacrylate, based on the weight of the matrix of the light-scattering layer.

In one particular aspect of the present invention, the poly(meth)acrylates of the matrix of the light-scattering layer have a refractive index in the range from 1.46 to 1.54, measured for the sodium D line (589 nm) and at 20° C.

The moulding compositions for preparing the light-scattering layer may comprise conventional additives of any type. Among these are antistatic agents, antioxidants, mould-release agents, flame retardants, lubricants, dyes, flow improvers, fillers, light stabilizers, UV absorbers and organophosphorous compounds, such as phosphites or phosphonates, pigments, weathering stabilizers and plasticizers. However, the amount of additives is restricted in relation to the intended use. For example, the light-scattering property of the polymethyl methacrylate layer should not be excessively impaired by additives, nor should its transparency.

In one particular aspect of the present invention, the moulding composition may, where appropriate, be given greater mechanical stability by an impact modifier. These impact modifiers for polymethacrylates are well known, and EP-A 0 113 924, EP-A 0 522 351, EP-A 0 465 049 and EP-A 0 683 028, inter alia, describe the preparation and the structure of impact-modified polymethacryl ate moulding compositions.

Preferred impact-modified moulding compositions which may be used to prepare the matrix comprise from 70 to 99% by weight of polymethyl methacrylates. These polymethyl methacrylates have been described above.

In one particular aspect of the present invention, the polymethyl methacrylates used to prepare impact-modified moulding compositions are obtained via free-radical polymerization of mixtures which encompass from 80 to 100% by weight, preferably from 90 to 98% by weight, of methyl methacrylate and, where appropriate, from 0 to 20% by weight, preferably from 2 to 10% by weight, of other comonomers capable of free-radical polymerization, these likewise having been listed above. Particularly preferred comonomers are, inter alia, $C_1$–$C_4$-alkyl (meth)acrylates, in particular methyl acrylate, ethyl acrylate or butyl methacrylate.

The average molar mass Mw of the polymethyl methacrylates which can serve for preparing the impact-modified matrix is preferably in the range from 90 000 to 200 000 g/mol, in particular from 100 000 to 150 000 g/mol.

Preferred impact-resistant moulding compositions which can serve for preparing the matrix comprise from 1 to 30% by weight, preferably from 2 to 20% by weight, particularly preferably from 3 to 15% by weight, in particular from 5 to 12% by weight, of an impact modifier, this being an elastomer phase composed of crosslinked polymer particles.

Preferred impact-resistant moulding compositions which can serve for preparing the matrix comprise from 0.5 to 55% by weight, preferably from 1 to 45% by weight, particularly preferably from 2 to 40% by weight, in particular from 3 to 35% by weight, of an impact modifier, this being an elastomer phase composed of crosslinked polymer particles.

The impact modifier may be attained in a manner known per se via bead polymerization or via emulsion polymerization.

Preferred impact modifiers are crosslinked particles whose average particle size is in the range from 50 to 1000 nm, preferably from 60 to 500 nm and particularly preferably from 80 to 120 nm.

By way of example, these particles may be obtained via free-radical polymerization of mixtures which generally comprise at least 40% by weight, preferably from 50 to 70% by weight, of methyl methacrylate, from 20 to 80% by weight, preferably from 25 to 35% by weight, of butyl acrylate, and also from 0.1 to 2% by weight, preferably from 0.5 to 1% by weight, of a crosslinking monomer, e.g. a polyfunctional (meth)acrylate, e.g. allyl methacrylate, and which comprise comonomers which can be copolymerized with the abovementioned vinyl compounds.

Among the preferred comonomers are, inter alia, $C_1$–$C_4$-alkyl (meth)acrylates, such as ethyl acrylate or butyl methacrylate, preferably methyl acrylate, or other monomers including vinyl groups capable of polymerization, e.g. styrene. The mixtures for producing the abovementioned particles may preferably encompass from 0 to 10% by weight, with preference from 0.5 to 5% by weight, of comonomers.

Particularly preferred impact modifiers are polymer particles which have a two-layer, or particularly preferably a three-layer, core-shell structure. These core-shell polymers are described in EP-A 0 113 924, EP-A 0 522 351, EP-A 0 465 049 and EP-A 0 683 028, inter alia.

Particularly preferred impact modifiers based on acrylate rubber have the following structure, inter alia:

| Core: | Polymer with at least 90% by weight methyl methacrylate content, based on the weight of the core. |
|---|---|
| Shell 1: | Polymer with at least 80% by weight butyl acrylate content, based on the weight of the first shell. |
| Shell 2: | Polymer with at least 90% by weight methyl methacrylate content, based on the weight of the second shell. |

The core may comprise not only the monomers mentioned but also other monomers, as may each of the shells. These have been mentioned previously, with particularly preferred comonomers having a cross-linking action.

By way of example, a preferred acrylate rubber modifier may have the following structure:

| Core: | copolymer composed of methyl methacrylate (95.7% by weight) ethyl acrylate (4% by weight) and allyl methacrylate (0.3% by weight) |
|---|---|
| S1: | copolymer composed of butyl acrylate (81.2% by weight), styrene (17.5% by weight) and allyl methacrylate (1.3% by weight) |
| S2: | copolymer composed of methyl methacrylate (96% by weight) and ethyl acrylate (4% by weight). |

The core:shell(s) ratio of the acrylate rubber modifiers may vary within a wide range. The core:shell ratio C/S is preferably in the range from 20:80 to 80:20, with preference from 30:70 to 70:30 in the case of modifiers with one shell, or in the case of modifiers with two shells the core:shell 1:shell 2 ratio C/S1/S2 is preferably in the range from 10:80:10 to 40:20:40, particularly preferably from 20:60:20 to 30:40:30.

The particle size of the core-shell modifier is usually in the range from 50 to 1000 nm, preferably from 100 to 500 nm and particularly preferably from 150 to 450 nm, with no intended resultant restriction.

Impact modifiers of this type are commercially obtainable from Mitsubishi with the trade name METABLEN® IR 441. It is also possible to obtain impact-modified moulding compositions.

Particularly preferred moulding compositions for preparing the plastics matrix are obtainable commercially from Röhm GmbH & Co. KG.

The thickness of the light-scattering polymethyl methacrylate layer is generally in the range from 0.05 to 4 mm.

According to the invention, the concentration of the spherical particles $c_P$, the thickness of the light-scattering polymethyl methacrylate layer $d_S$, and also the size of the spherical particles $D_P$, is selected in such a way that the ratio of the product of concentration of the spherical particle $c_P$ and thickness of the light-scattering polymethyl methacrylate layer to the third power of the particle size of the spherical particles $c_P*d_S/D_P^3$ is in the range from 0.0015 to 0.015% by weight*mm/µm³, preferably from 0.0025 to 0.009% by weight*mm/µm³.

The ratio of average surface roughness of the polymethyl methacrylate layer $R_a$ to the particle size of the spherical particles $D_P$ is in the range from 0.05 to 0.4, in particular from 0.05 to 0.3 and preferably from 0.06 to 0.2.

According to one particular embodiment of the screen of the present invention, the ratio of concentration of the spherical particles $c_P$ to the thickness of the light-scattering polymethyl methacrylate layer $d_S$ $c_P/d_S$ is greater than or equal to 2.5% by weight/mm, in particular greater than or equal to 4% by weight/mm.

The gloss R85° of the light-scattering polymethyl methacrylate layer is preferably smaller than or equal to 60, in particular smaller or equal to 50.

The ratio of thickness of the light-scattering polymethyl methacrylate layer $d_S$ and particle size of the spherical particles $D_P$ $d_S/D_P$ is preferably in the range from 5 to 1500, in particular from 5 to 500, preferably from 5 to 250, particularly preferably from 5 to 150 and from 10 to 300, with no intended resultant restriction.

According to one particular embodiment of the present invention, the average surface roughness $R_a$ of the sheet is preferably in the range from 0.4 to 6 µm, in particular from 0.4 to 2 µm, preferably from 0.5 to 1.5 µm, in particular from 0.8 to 5 µm, particularly preferably from 1 to 3.5 µm.

Within this range, the visibility of scratches on the surface of the light-scattering layer is limited to a particularly low level. This low susceptibility to scratching may be determined to DIN 53799 and DIN EN 438 via visual assessment of a damaged surface, the damage being brought about by a diamond acting on the surface with varying force.

The surface roughness $R_a$ of the sheet may be affected via variation of various parameters, which depend on the production method. Among these are the temperature of the melt during the extrusion process, a rougher surface being given by a higher temperature of the melt. However, a factor which has to be considered here is that the temperature of the melt depends on the precise constitution of the moulding composition. The temperature of the melt is generally in the range from 150 to 300° C., preferably in the range from 200 to 290° C. These temperatures are based on the temperatures of the melt on discharge from the die.

The surface roughness may also be affected via the gap between the rollers used to polish the sheets. For example, if a polishing stack encompasses three rollers in an L arrangement, where the moulding composition is conducted from the die into the gap between roller 1 and roller 2 and as a 60–180o wrap around roller 2, the gap between roller 2 and roller 3 polishes the surfaces. If the gap between roller 2 and roller 3 is adjusted to the thickness of the sheet, the scattering particles on the sheet surface are pressed into the matrix, making the surface more polished. To achieve a rougher surface, this gap is generally adjusted to be somewhat larger than the thickness of the sheet to be produced, the relevant value being in the range from 0.1 to 2 mm above the thickness of the sheet, preferably from 0.1 to 1.5 mm above the thickness of the sheet, with no intended resultant restriction. The surface roughness is also affected via the particle size and the thickness of the sheet, the dependencies being shown in the examples.

The light-scattering layer may be produced via known processes, preference being given to thermoplastic shaping processes. Once the particles have been added, light-scattering layers can be produced from the moulding compositions described above via conventional thermoplastic shaping processes.

According to one particular embodiment, a twin-screw extruder is used for the extrusion process or for the production of pellets of moulding compositions comprising scattering beads. In these processes, the plastics particles are preferably converted into the melt in the extruder. By this means it is possible to obtain melts which can give screens whose transmittance is particularly high.

The rear-projection screens here may be produced via a two-stage process in which the extrusion of the foil or sheet in a single-screw extruder is carried out downstream of an inventive sidefeeder compounding process in a twin-screw extruder and intermediate pelletization. The pellets obtained via the twin-screw extruder may be provided with particularly high proportions of scattering beads, making it simple to produce projection screens with varying content of scattering beads via blending with moulding compositions without scattering beads.

It is also possible to carry out a single-stage process in which the compounding of the spherical plastics particles into the melt takes place as described in a twin-screw extruder which, where appropriate, has a downstream pressure-increasing unit (e.g. melt pump) which is immediately followed by the extrusion die, which extrudes a sheet product. Surprisingly, the means described above can give rear-projection screens with a particularly low yellowness index.

The screens may moreover also be produced by injection moulding, in which case, however, the selection of the process parameters or the injection mould is to be such as to give a surface roughness in the inventive range.

The compounding of the matrix with the scattering particles preferably takes place via a twin-screw extruder, and the actual sheet extrusion can also use a single-screw extruder, with no intended resultant restriction.

Depending on the nature of the application, the light-scattering polymethyl methacrylate layer may be used as a screen. The relatively thin layers here may be used in the form of a foil which can be rolled up. Particularly preferred foils are rendered impact-resistant via the methods described above.

A thin light-scattering polymethyl methacrylate layer may moreover be applied to a plastics sheet, in order to increase its mechanical stability. This plastics sheet generally comprises no spherical particles. This plastics sheet preferably comprises polyacrylic polymers.

According to one particular aspect of the present invention, the transmittance of the screen is greater than or equal to 25%, in particular greater than or equal to 40% and particularly preferably greater than or equal to 55%.

According to one particular aspect of the present invention, the moulding composition may be coloured. Surprisingly, this measure permits improvement of the contrast. Particularly suitable materials for the colouring process are dyes known per se and/or carbon black. Particularly preferred dyes are commercially available. Among these are ®Sandoplast Red G and ®Sandoplast Yellow 2G, each from Clariant, and ®Macroplex Green 5B and ®Macroplex Violet 3R, each from Bayer. The concentration of these dyes depends on the desired perceived colour, and also on the thickness of the sheet. With no intended resultant restriction, this concentration is generally in the range from 0 to 0.8% by weight per dye, preferably from 0.000001 to 0.4% by weight, based on the total weight of the coloured moulding composition without scattering beads. The sum of the dye concentrations is preferably in the range from 0 to 1% by weight, preferably from 0.0001 to 0.6% by weight, based on the total weight of coloured moulding composition without scattering beads. The loss of transmittance may at least to some extent be compensated via more powerful projectors.

The yellowness index of the screen is preferably smaller than or equal to 12, in particular smaller than or equal to 10, with no intended resultant restriction.

One particular embodiment of the screen of the present invention has a halved-intensity angle greater than or equal to 15°, in particular greater than or equal to 25°.

According to one particular aspect of the present invention, the screen exhibits a scattering power greater than or equal to 0.15, in particular greater than or equal to 0.35, with no intended resultant restriction.

According to one preferred embodiment, the surface of the inventive polymethyl methacrylate sheets has a matt appearance under reflected light. Gloss measurement using a reflectometer to DIN 67530 may be used for characterization. The gloss of the sheets is preferably below 50, particularly preferably below 40 and very particularly preferably below 30, with an angle of 85°.

There is no restriction on the size and shape of the rear-projection screen of the present invention. However, the screen usually has the shape of a rectangular panel, because it is the usual format for presenting pictures.

The length of this type of rear-projection screen is preferably in the range from 25 to 10 000 mm, with preference from 50 to 3000 mm and particularly preferably from 200 to 2000 mm. The width of this particular embodiment is generally in the range from 25 to 10 000 mm, preferably from 50 to 3000 mm and particularly preferably from 200 to 2000 mm. Two or more of these screens may be brought together in order to provide a particularly large projection surface.

According to one particular embodiment, the screen has particularly high weathering resistance to DIN EN ISO 4892, Part 2—Methods of exposure to laboratory light sources: xenon arc sources.

EXAMPLES AND COMPARATIVE EXAMPLES ARE USED BELOW FOR MORE DETAILED DESCRIPTION OF THE INVENTION, BUT THERE IS NO INTENTION THAT THE INVENTION BE RESTRICTED TO THESE EXAMPLES.

A) Test Methods

Average roughness $R_a$ was determined to DIN 4768 using Taylor Hobson Talysurf 50 test equipment.

Transmittance $\tau_{D65/2}°$ was determined to DIN 5036 using Perkin Elmer Lambda 19 test equipment.

Yellowness index $T_{D65/10}°$ was determined to DIN 6167 using Perkin Elmer Lambda 19 test equipment.

R85° gloss was determined at 85° to DIN 67530 using a laboratory reflectometer from Dr. Lange.

Scattering power and halved-intensity angle were determined to DIN 5036 using a GO-T-1500 LMT goniometer test unit.

The various rear-projection screens were also assessed visually on the basis of the criteria shown in Table 1.

The projector used here was an Epson EMP-713. The test picture was assessed at a distance of about 1–1.5 m from the image at various angles (0°=perpendicular to the projection normal, 30° and 60°). The distance of the projector from the projection sheet was about 85 cm and the image diagonal was about 50 cm.

Technical data for Epson EMP 713 projector:

Projection system: dichroitic mirror and lens system, pixels: 2359296 pixels (1024×768)*3, brightness: 1200 ANSI lumens, contrast: 400:1, picture brilliance: 85%, colour output: 24 bit, 16.7 million colours, H: 15–92 kHz, V: 50–85 Hz, lamp: 150 watt UHE, video resolution: 750 TV lines

TABLE 1

| Criterion | Property |
|---|---|
| Hot spot | A hot spot is light distribution associated with the conical beam of light of the projection illumination system. A hot spot is therefore a conical beam of light with substantially greater brightness in the centre than at the margin of the image. If the hot spot is very pronounced, the projector lamp is visually detectable. |
| Brightness distribution | Brightness distribution is likewise assessed via the distribution of light on the image surface and therefore characterizes the extent to which the illumination of the image extends from the centre to the margin. |
| Picture sharpness | Picture sharpness is the degree of perceived clarity of the test picture. |
| Resolution | The resolution of the image gives the extent to which fine structures are distorted on the sheet assessed. |
| Picture steadiness | Picture steadiness is the extent to which the observer can receive the projected information over a prolonged period without eye strain. |

The tables indicate very good properties by ++, good properties by +, satisfactory propeties by 0, unsatisfactory properties by −, very unsatisfactory properties by −− and inadequate properties by −−−.

B) Preparation of Plastics Particles

To prepare the spherical plastics particles, use was made of an aluminium hydroxide Pickering stabilizer, prepared by precipitation from aluminium sulphate and soda solution directly prior to starting the actual polymerization. To this end, 16 g of $Al_2(SO_4)_3$, 0.032 g of complexing agent (Trilon A) and 0.16 g of emulsifier (emulsifier K 30 obtainable from Bayer AG; sodium salt of a $C_{15}$ paraffinsulphonate) were first dissolved in 0.8 l of distilled water. A 1N sodium carbonate solution was then added, with stirring and at a temperature of about 40° C., to the aluminium sulphate dissolved in water, the resultant pH being in the range from 5 to 5.5. This procedure gave a colloidal dispersion of the stabilizer in the water.

After the precipitation of the stabilizer, the aqueous phase was transferred to a glass beaker. 110 g of methyl methacrylate, 80 g of benzyl methacrylate, 10 g of allyl methacrylate, 4 g of dilauryl peroxide and 0.4 g of tert-butyl 2-ethylperhexanoate were added into the beaker. This mixture was dispersed by a disperser (UltraTurrax S50N-G45MF, Janke and Kunkel, Staufen) for 15 minutes at 7000 rpm.

Following this exposure to shear, the reaction mixture was charged to the reactor, which had been preheated to the appropriate reaction temperature of 80° C., and polymerized with stirring (600 rpm) at about 80° C. (polymerization temperature) for 45 minutes (polymeriz-ation time). A post-reaction phase then followed at about 85° C. internal temperature for 1 hour. After cooling to 45° C., the stabilizer was converted into water-soluble aluminium sulphate by adding 50% strength sulphuric acid. The beads were worked up by filtering the resultant suspension through a commercially available textile filter and drying at 50° C. for 24 hours in a heated cabinet.

The size distribution was studied by laser extinction. The average size $V_{50}$ of the particles was 19.66 μm. The beads had a spherical shape, no fibres being detected. No coagulation occurred. The resultant particles are termed plastics particles A below.

C) Inventive Examples 1–6 and Comparative Examples 1–3

Various rear-projection screens were produced via extrusion. To this end, various compounded materials comprising scattering beads were first prepared from plastics particles A and a PMMA moulding composition obtainable from Röhm GmbH & Co. KG (copolymer of 97% by weight of methyl methacrylate and 3% by weight of methyl acrylate) in a ZSK 30 Werner & Pfleiderer twin-screw extruder, using side feeder technology=direct feed into the melt downstream of the vent zone. The pellets obtained form the basis for the subsequent production of the plastics sheets described in the examples. The concentrate was used in subsequent processing for the extrusion-processing of various blends to give varying content of the scattering particles described. A BREYER Ø60 mm extruder was used. The temperature of the melt on discharge from the die was generally 270° C., but the die discharge temperature was 260° C. in comparative example 2. The adjustment of the polishing stack was generally, and in particular in the examples, such as to achieve maximum surface roughness.

The proportion of plastics particles in the polymethyl methacrylate matrix is shown in Table 2, as is the thickness of the sheets. The test results obtained by the abovementioned methods are given in Tables 3, 4, 5 and 6.

D) Inventive Examples 7–14 and Comparative Examples 4–6

The production process described in inventive examples 1–6 was in essence repeated, but ®Techpolymer SBX-8 from Sekisui and a PMMA moulding composition obtainable from Röhm GmbH & Co. KG (copolymer of 97% by weight of methyl methacrylate and 3% by weight of methyl acrylate) were extruded to give plastics sheets.

The proportion of plastics particles in the polymethyl methacrylate matrix is shown in Table 2, as is the thickness of the sheets. The test results obtained by the abovementioned methods are given in Tables 3, 4, 5 and 6.

TABLE 2

| | Size of plastics particles [μm] | Thickness of sheet [mm] | Content in [% by weight] |
|---|---|---|---|
| Comp. Ex. 1 | 20 | 3 | 6 |
| Inventive example 1 | 20 | 3 | 12 |
| Inventive example 2 | 20 | 3 | 24 |
| Comp. Ex. 2 | 20 | 1 | 12 |
| Inventive example 3 | 20 | 1 | 24 |
| Inventive example 4 | 20 | 0.5 | 24 |
| Inventive example 5 | 20 | 0.5 | 48 |
| Comp. Ex. 3 | 20 | 0.25 | 24 |
| Inventive example 6 | 20 | 0.25 | 48 |
| Comp. Ex. 4 | 8 | 3 | 1 |
| Comp. Ex. 5 | 8 | 3 | 3 |
| Comp. Ex. 6 | 8 | 1 | 1 |
| Inventive example 7 | 8 | 1 | 3 |
| Inventive example 8 | 8 | 1 | 6 |
| Inventive example 9 | 8 | 0.5 | 3 |
| Inventive example 10 | 8 | 0.5 | 6 |
| Inventive example 11 | 8 | 0.5 | 12 |
| Inventive example 12 | 8 | 0.25 | 6 |
| Inventive example 13 | 8 | 0.25 | 12 |
| Inventive example 14 | 8 | 0.25 | 24 |

TABLE 3

|  | $c_P \cdot d_S/D_P^3$ [% by weight* mm/μm³] | $R_a$ [μm] | $R_a D_P$ |
|---|---|---|---|
| Comp. Ex. 1 | 0.00225 | 0.9 | 0.045 |
| Inventive example 1 | 0.0045 | 1.5 | 0.075 |
| Inventive example 2 | 0.009 | 2.5 | 0.125 |
| Comp. Ex. 2 | 0.0015 | 0.8 | 0.04 |
| Inventive example 3 | 0.003 | 2.5 | 0.125 |
| Inventive example 4 | 0.0015 | 3.2 | 0.16 |
| Inventive example 5 | 0.003 | 4.9 | 0.245 |
| Comp. Ex. 3 | 0.00075 | 4.8 | 0.24 |
| Inventive example 6 | 0.0015 | 6.6 | 0.33 |
| Comp. Ex. 4 | 0.00586 | 0.24 | 0.03 |
| Comp. Ex. 5 | 0.01758 | 0.29 | 0.03625 |
| Comp. Ex. 6 | 0.00195 | 0.18 | 0.0225 |
| Inventive example 7 | 0.00586 | 0.4 | 0.05 |
| Inventive example 8 | 0.01172 | 0.62 | 0.0775 |
| Inventive example 9 | 0.00293 | 0.48 | 0.06 |
| Inventive example 10 | 0.00586 | 0.66 | 0.0825 |
| Inventive example 11 | 0.01172 | 0.81 | 0.10125 |
| Inventive example 12 | 0.00293 | 0.8 | 0.1 |
| Inventive example 13 | 0.00586 | 1.07 | 0.13375 |
| Inventive example 14 | 0.01172 | 1.48 | 0.185 |

TABLE 4

|  | Transmittance [%] | Yellowness index YI ($\tau_{D65/10°}$) | Scattering power σ |
|---|---|---|---|
| Comp. Ex. 1 | 90.75 | 3.16 | 0.25 |
| Inventive example 1 | 75.22 | 9.16 | 0.48 |
| Inventive example 2 | 60.62 | 10.74 | 0.65 |
| Comp. Ex. 2 | 93.78 | 0.81 | 0.16 |
| Inventive example 3 | 86.73 | 3.81 | 0.35 |
| Inventive example 4 | 88.81 | 1.64 | 0.26 |
| Inventive example 5 | 78.42 | 3.18 | 0.41 |
| Comp. Ex. 3 | 88.33 | 0.32 | 0.19 |
| Inventive example 6 | 78.04 | 0.99 | 0.20 |
| Comp. Ex. 4 | 60.71 | 6.75 | 0.63 |
| Comp. Ex. 5 | 47.72 | 5.35 | 0.88 |
| Comp. Ex. 6 | 88.65 | 2.35 | 0.11 |
| Inventive example 7 | 69.05 | 5.82 | 0.62 |
| Inventive example 8 | 58.06 | 6.55 | 0.84 |
| Inventive example 9 | 82.04 | 3.73 | 0.35 |
| Inventive example 10 | 71.62 | 5.35 | 0.61 |
| Inventive example 11 | 61.82 | 6.05 | 0.81 |
| Inventive example 12 | 83.64 | 3.43 | 0.31 |
| Inventive example 13 | 73.52 | 5.17 | 0.56 |
| Inventive example 14 | 61.33 | 6.04 | 0.82 |

TABLE 5

|  | R85° gloss measurement | Hot spot | Brightness distribution |
|---|---|---|---|
| Comp. Ex. 1 | 35.0 | − | − |
| Inventive example 1 | 8.6 | + | + |
| Inventive example 2 | 2.3 | ++ | ++ |
| Comp. Ex. 2 | 10.1 | − | − |
| Inventive example 3 | 1.6 | 0 | 0 |
| Inventive example 4 | 1.3 | 0 | 0 |
| Inventive example 5 | 0.5 | ++ | + |
| Comp. Ex. 3 | 0.9 | --- | --- |
| Inventive example 6 | 0.3 | 0 | 0 |
| Comp. Ex. 4 | 84.7 | ++ | ++ |
| Comp. Ex. 5 | 77.2 | ++ | ++ |
| Comp. Ex. 6 | 86.9 | --- | --- |
| Inventive example 7 | 47.2 | ++ | + |
| Inventive example 8 | 29.4 | ++ | ++ |
| Inventive example 9 | 55.1 | + | + |
| Inventive example 10 | 36.9 | ++ | ++ |
| Inventive example 11 | 26.4 | ++ | ++ |
| Inventive example 12 | 17.6 | 0 | 0 |
| Inventive example 13 | 7.3 | ++ | + |
| Inventive example 14 | 2.1 | ++ | + |

TABLE 6

|  | Picture sharpness | Resolution | Picture steadiness |
|---|---|---|---|
| Comp. Ex. 1 | + | fine | + |
| Inventive example 1 | + | fine | + |
| Inventive example 2 | 0 | fine | + |
| Comp. Ex. 2 | + | fine | − |
| Inventive example 3 | + | fine | 0 |
| Inventive example 4 | + | fine | 0 |
| Inventive example 5 | + | fine | + |
| Comp. Ex. 3 | 0 | fine | − |
| Inventive example 6 | 0 | fine | − |
| Comp. Ex. 4 | − | fine | + |
| Comp. Ex. 5 | −− | fine | − |
| Comp. Ex. 6 | ++ | very fine | − |
| Inventive example 7 | + | very fine | + |
| Inventive example 8 | 0 | fine | + |
| Inventive example 9 | ++ | very fine | + |
| Inventive example 10 | ++ | very fine | + |
| Inventive example 11 | 0 | fine | + |
| Inventive example 12 | ++ | very fine | + |
| Inventive example 13 | ++ | very fine | + |
| Inventive example 14 | 0 | fine | + |

Examples of Measurement of Optical Scratch Susceptibility

Using the rear-protection screens produced in inventive examples 1, 4, 5, 6 and 11, the visual susceptibility to scratching of the extrudates was studied.

Susceptibility to scratching was tested via the penetration depth of a diamond $t_R = f$ (load), using the Taber Industries 203 scratch tester, the method being based on DIN 53799 and DIN EN 438: diamond gouge with 90° cone angle, peak radius 90 μm, direction of rotation anticlockwise. The loads used are shown in Table 7.

A black substrate was used for visual assessment (reflection test). The tests (roughness, gloss) were carried out on the upper side of the test extrudates.

The results obtained are listed in Table 7.

TABLE 7

| Load on diamond | Inventive example 1 | Inventive example 4 | Inventive example 5 |
|---|---|---|---|
| 0.4 N | no discernible damage | no discernible damage | discernible damage (additional reflections, angle-dependent) |
| 0.7 N | no discernible damage | hardly any discernible damage (additional reflections, highly angle-dependent) | discernible damage (additional reflections, angle-dependent) |
| 1.0 N | no discernible damage | hardly any discernible damage (additional reflections, angle-dependent) | discernible damage (additional reflections, angle-dependent) |
| 1.5 N | slight discernible damage (additional reflections, highly angle-dependent) | slight discernible damage (additional reflections, angle-dependent) | discernible damage (additional reflections, angle-dependent) |

TABLE 7-continued

| | | | |
|---|---|---|---|
| 2.0 N | slight discernible damage (additional reflection, highly angle-dependent) | discernible damage | discernible damage |

| Load on diamond | Inventive example 6 | Inventive example 11 |
|---|---|---|
| 0.4 N | Discernible damage (additional reflections, angle-dependent) | no discernible damage |
| 0.7 N | Discernible damage (additional reflections, angle-dependent) | hardly any discernible damage (additional reflections, highly angle-dependent) |
| 1.0 N | Discernible damage (additional reflections, angle-dependent) | slight discernible damage (additional reflections, angle-dependent) |
| 1.5 N | Discernible damage | slight discernible damage (additional reflections, angle-dependent) |
| 2.0 N | Discernible damage | discernible damage |

The inventive examples and comparative examples clearly show that rear-projection screens which provide ideal picture quality are only obtained from a combination of a certain narrow range for the relative surface roughness $R_a/D_P$ and the ratio $c_P*d_S/D_P^3$.

The embodiment where the particles are introduced directly into the melt may be successfully used to produce pellets or mouldings which encompass a second component, such as plastics particles (side feeder process). This technology is therefore not restricted to this invention.

A feature of the side feeder process is that the moulding compositions to be compounded are not fed simultaneously through the feed zone but that only the parent component passes through the feed zone, while the 2nd component is fed into the melt after the parent moulding composition has been melted. The melts are then homogenized through mixing and shearing sections whose arrangement—and therefore mode of action—can be adapted so as to avoid any adverse effect on the material to be mixed.

Figure 1:
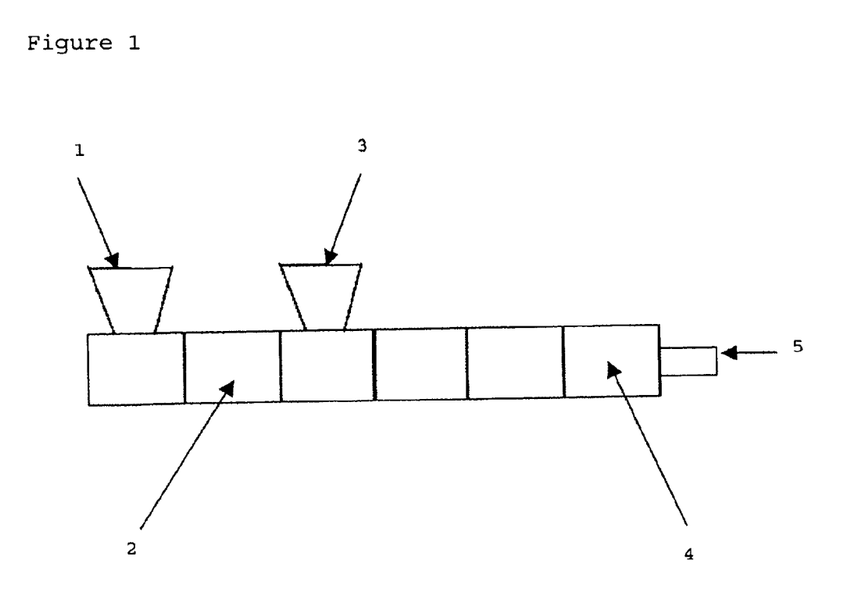

The homogenized melt is then processed through strand pelletization or die-face cutting under water, to give uniformly sized pellets (see FIG. 1).

FIG. 1 shows a diagram of compounding via a twin-screw extruder (side feeder technology). The reference numerals in FIG. 1 indicate:
1. addition of the moulding composition through the feed zone
2. molten moulding composition (e.g. a PMMA obtainable from Röhm GmbH & Co. KG)
3. addition of the scattering agents (e.g. Techpolymer SBX8) to the hot plastics melt
4. homogeneous melt of scattering beads in moulding composition
5. extrudate, e.g. 48% strength masterbatch of scattering beads in a moulding composition (uniformly sized pellets)

Figure 2:
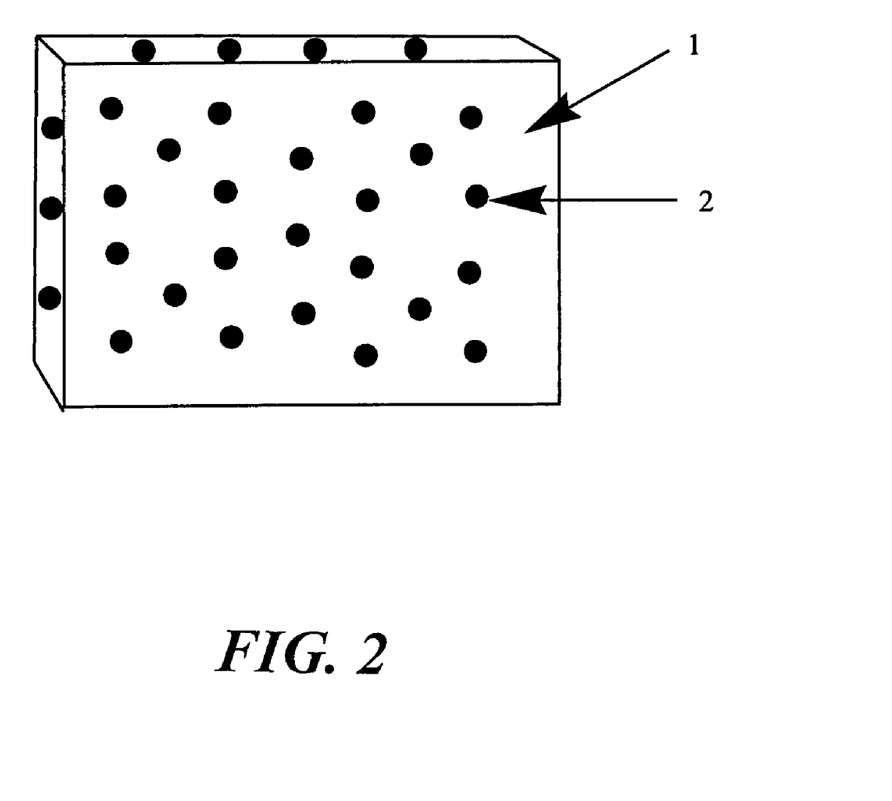

FIG. 2 shows a rear projection screen that has a light-scattering polymethyl methacrylate layer in which spherical plastic particles are embedded. The reference numbers in FIG. 2 indicate: 1) the polymethyl methacrylate layer; and 2) one of the spherical plastic particles.

Figure 3:
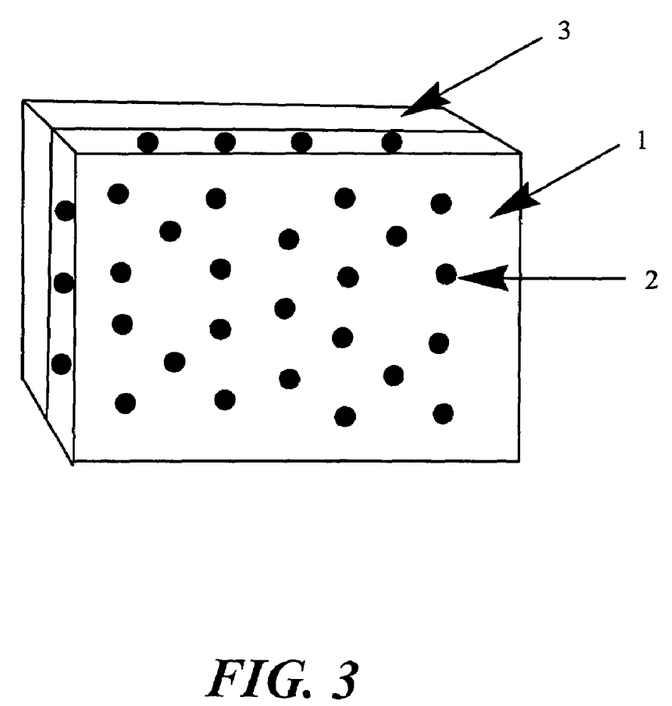

FIG. 3 shows a rear projection screen that has two layers. The first layer is a light-scattering polymethyl methacrylate layer in which spherical plastic particles are embedded. The second layer is a plastic sheet which has no scattering beads embedded therein. The reference numbers in FIG. 3 indicate: 1) the polymethyl methacrylate layer; 2) one of the spherical plastic particles; and 3) the plastic sheet which has no scattering beads embedded therein.

The DF moulding composition serves as starting material in a second stage for the production of the various products, with only slight degradation of the 2nd component. This can give substantial advantages. Among these in the case of beads are a low level of discoloration of the products, e.g. light-scattering or light-conducting sheets (yellowness index) and high transmittance.

According to one particular embodiment, a twin-screw extruder is used for the compounding process.

The side feeder process can moreover also give similarly good results for the compounding process using single-screw extruders specifically designed for the processing of powders, and using side feeder technology.

The invention claimed is:

1. A rear-projection screen, comprising:
   at least one light-scattering polymethyl methacrylate layer of thickness in the range from 0.05 to 4 mm comprising spherical plastic particles whose size is in the range from 5 to 35 µm at a concentration in the range from 2 to 60% by weight, based on the total weight of the light-scattering polymethyl methacrylate layer;
   wherein the refractive index of the spherical plastic particles differs from that of the polymethyl methacrylate layer by a value in the range from 0.02 to 0.2;
   wherein the concentration of the spherical plastic particles $c_P$, the thickness of the light-scattering polymethyl methacrylate layer $d_S$, and the size of the spherical plastic particles $D_P$ are selected in such a way that the ratio $c_P*d_S/D_P^3$ is in the range from 0.0015 to 0.015% by weight*mm/µm$^3$; and
   the ratio of average surface roughness of the polymethyl methacrylate layer $R_a$ to the size of the spherical plastic particles $D_P$ is in the range from 0.05 to 0.4.

2. The rear-projection screen according to claim 1, wherein the ratio of concentration of the spherical plastic particles, $c_P$, to the thickness of the light-scattering polymethyl methacrylate layer, $d_S$, $c_P/d_S$, is greater than or equal to 2.5% by weight/mm.

3. The rear-projection screen according to claim 1, wherein the gloss R85° of the light-scattering polymethyl methacrylate layer is less than or equal to 60.

4. The rear-projection screen according to claim 1, wherein the ratio $c_P*d_S/D_P^3$ is in the range from 0.0025 to 0.009% by weight*mm/µm$^3$.

5. The rear-projection screen according to claim 1, wherein the ratio derived from thickness of the light-scattering polymethyl methacrylate layer $d_S$ and the size of the spherical plastic particles $D_P$ is in the range from about 1.4 to 800.

6. The rear-projection screen according to claim 1, wherein the spherical plastic particles encompass crosslinked polystyrene and/or crosslinked poly(meth)acrylates.

7. The rear-projection screen according to claim 1, wherein said light-scattering polymethyl methacrylate layer has been coloured.

8. The rear-projection screen according to claim 1, wherein the light-scattering polymethyl methacrylate layer has a refractive index in the range from 1.46 to 1.54, measured at the sodium D line (589 nm) and at 20° C.

9. The rear-projection screen according to claim 1, wherein the average surface roughness $R_a$ of the light-scattering polymethyl methacrylate layer is in the range from 0.4 to 6 µm.

10. A rear-projection screen according to claim 1, wherein at least 60% of the spherical plastic particles have a diameter in the range from 15 μm to 35 μm.

11. The rear-projection screen according to claim 1, wherein at least 60% of the spherical plastic particles have a diameter of at least 15 μm and at most 30% of the spherical plastic particles have a diameter of more than 25 μm.

12. The rear-projection screen according to claim 1, further comprising a plastic sheet which has no scattering beads.

13. The rear-projection screen according to claim 12, wherein the plastic sheet comprises polyacrylic polymers.

14. The rear-projection screen according to claim 1, wherein the rear-projection screen has a transmittance greater than or equal to 25%.

15. The rear-projection screen according to claim 1, wherein the rear-projection screen has a yellowness index smaller than or equal to 12.

16. The rear-projection screen according to claim 1, wherein the rear-projection screen has a halved-intensity angle greater than or equal to 15°.

17. The rear-projection screen according to claim 1, wherein the rear-projection screen has a scattering power greater than or equal to 0.15.

18. A process for producing the rear-projection screen of claim 1, comprising melting a moulding composition;

incorporating and mixing spherical plastic particles into the molten moulding composition; and extruding the molten moulding composition comprising spherical plastic particles to produce the rear-projection screen.

* * * * *

UNITED STATES PATENT AND TRADEMARK OFFICE
CERTIFICATE OF CORRECTION

| | | |
|---|---|---|
| PATENT NO. | : 7,064,894 B2 | Page 1 of 1 |
| APPLICATION NO. | : 10/495428 | |
| DATED | : June 20, 2006 | |
| INVENTOR(S) | : Parusel et al. | |

It is certified that error appears in the above-identified patent and that said Letters Patent is hereby corrected as shown below:

On the title page, the Prior Publication Data. Item (65) should read:

-- (65) Prior Publication Data

US 2006/0018015 A2   Jan. 26, 2006 --

On the title page, the International Application No. Item (86) should read as follows:

-- (86) PCT No.:   PCT/EP03/10762 --

Signed and Sealed this

Twelfth Day of December, 2006

JON W. DUDAS
*Director of the United States Patent and Trademark Office*